United States Patent [19]

Eckert

[11] Patent Number: 4,709,474
[45] Date of Patent: Dec. 1, 1987

[54] TRACTOR DUAL WHEEL REMOVER

[76] Inventor: Bruce M. Eckert, 6526 Highway 38, Franksville, Wis. 53126

[21] Appl. No.: 940,936

[22] Filed: Dec. 12, 1986

[51] Int. Cl.⁴ ............................................. B23P 19/00
[52] U.S. Cl. ...................................... 29/802; 29/256; 29/264
[58] Field of Search ................. 29/802, 256, 263, 264; 254/13, 98, 100

[56] References Cited

U.S. PATENT DOCUMENTS

| | | | |
|---|---|---|---|
| 2,115,824 | 5/1938 | McRorey | 254/98 |
| 3,222,030 | 12/1965 | Thorpe | 254/100 |
| 3,634,921 | 1/1972 | Gagnon | 29/264 |
| 3,749,364 | 7/1973 | Sanchez | 254/100 |

FOREIGN PATENT DOCUMENTS 586917  4/1925  France .................................. 29/264

*Primary Examiner*—Howard N. Goldberg
*Assistant Examiner*—Irene G. Golabi
*Attorney, Agent, or Firm*—Peter N. Jansson, Ltd.

[57] ABSTRACT

A tractor dual wheel remover for loosening the dual wheel rim extension from telescoping frictional engagement with the rim of the adjacent main wheel after removal of connecting links between main-wheel eyelet members and aligned dual-wheel apertures. The device includes a rigid elongate member with a main-wheel end non-rotatably receiving one of the eyelets and a threaded shaft at the opposite end receivable through the corresponding dual-wheel aperture, and nut means on the shaft for off-center spreading to loosen the dual wheel.

12 Claims, 4 Drawing Figures

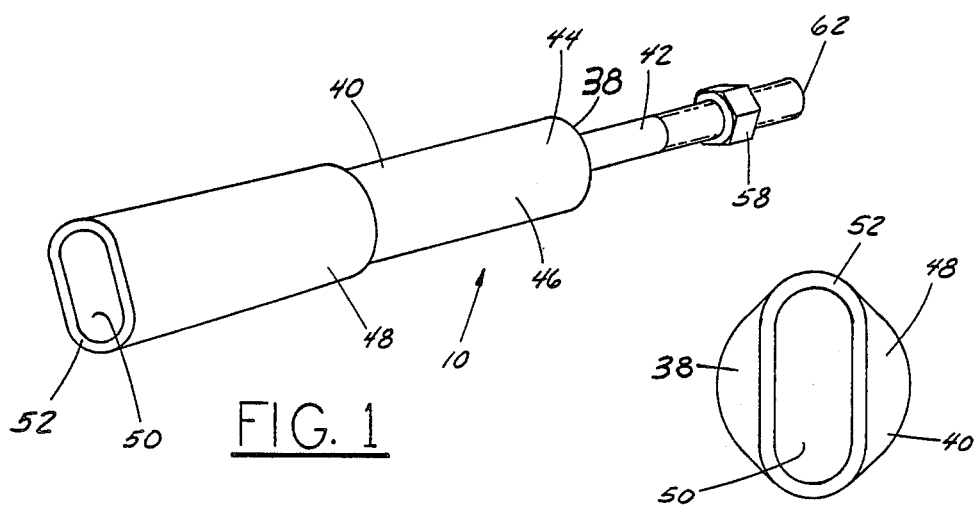
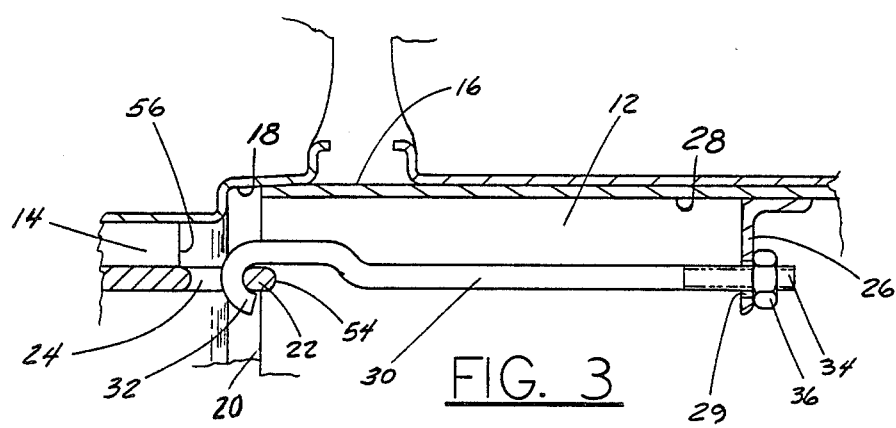
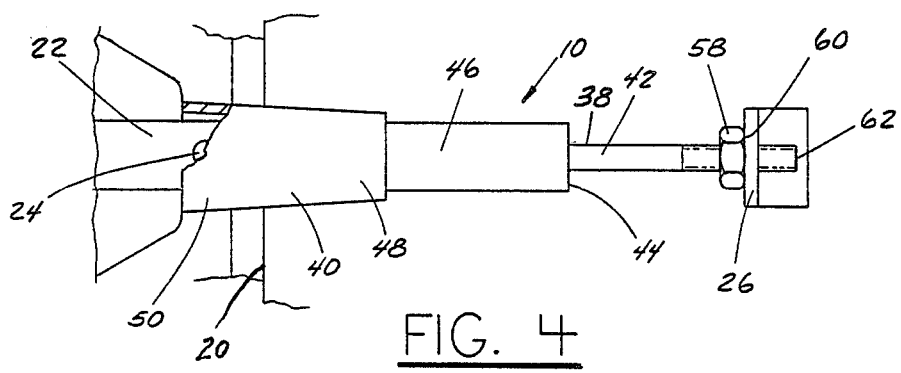

TRACTOR DUAL WHEEL REMOVER

FIELD OF THE INVENTION

This invention is related generally to wheel removing devices and, more particularly, to devices to facilitate removal of tractor dual wheels.

BACKGROUND OF THE INVENTION

A great many tractors used by farmers and others may be used with either two back driving wheels, one on each side, or four back driving wheels, two on either side aligned on a common axis. The two additional back wheels, usually referred to as dual wheels, provide a much greater support surface for the tractor, distributing the load over twice as much surface area. They also serve to distribute the driving force over such greater surface area.

Dual wheels are particularly helpful for certain types of operations, including operations in muddy soil and the like. However, dual wheels can hinder other tractor operations, particularly since they make the overall width of the tractor much greater, which tends to limit tractor maneuverability. Therefore, particularly for large farm tractors performing a number of different functions, it is considered desirable to have a single tractor adaptable for use either with or without dual wheels, as needed by the task at hand.

This requires an ability to mount and remove dual wheels frequently and easily. However, removal of dual wheels, particularly so-called "spacer duals," has been anything but easy. As a result, tractors are often used with dual wheels when they are not needed or without dual wheels when they may be helpful.

Spacer duals for tractors typically have a dual-wheel rim extension which is sized to engage, usually in telescoping fashion, the rim of the adjacent main wheel. The dual wheel is held in position against such main wheel by the use of a number of connecting links, such as J-bolts (usually 4–8), which extend between eyelet members on the rim of the main wheel and corresponding aligned apertures usually formed on tabs extending inwardly from the inside surface of the dual-wheel rim. When the dual wheel is mounted, such J-bolts are tightened to hold the wheel in place. Typically, they are tightened once or twice until there is firm engagement between the dual-wheel rim extension and the rim of the adjacent main wheel.

Even after a fairly limited amount of use of the tractor with the dual wheels in place, an extremely tight frictional engagement develops between the dual-wheel rim extension and the main-wheel rim. For the many farmers and others who use tractors with dual wheels, dual wheel removal is a major problem. While removal of the J-bolts is obviously an easy procedure, after removal J-bolt removal the dual-wheel rim extension remains in tight frictional engagement with the rim of the adjacent main wheel, until somehow or other this engagement is broken.

A variety of different methods have been used to break such frictional engagement. Some farmers use jacks of various kinds in make-shift operations which are time-consuming and difficult. Others will bang away with hammers, two-by-fours, and other implements, sometimes over extended periods, until such frictional engagement is broken. Still others have been known to simply continue using their tractors with the connecting links removed until the frictional engagement eventually breaks and the dual wheels fall off.

Various devices have been used in the past in different sorts of wheel pulling operations, including devices specifically intended for moving of large tractor wheels. Such devices are often complex in construction. Such devices typically apply force to a central point such as the axle, and in many cases have symmetrical application of force with respect to the wheel. Complex procedures are often required for set-up and use, and removal operations with such devices are often time-consuming.

There remains a need for a simple, inexpensive device for removal of tractor dual wheels which can carry out the dual wheel removal operation quickly and without difficulty.

OBJECTS OF THE INVENTION

It is an object of this invention to provide a tractor dual wheel remover overcoming the problems and shortcomings of the prior art.

Another objec of this invention is to facilitate changing of the tractor drive wheel configuration to more easily accommodate the specific tasks a hand.

Another object of this invention is to provide a tractor dual wheel remover which is simple in construction.

Another object of this invention is to provide a tractor dual wheel remover which may be used quickly and easily.

These and other important objects will be apparent from the descriptions of this invention which follow.

SUMMARY OF THE INVENTION

This invention is a tractor dual wheel remover for easily and quickly loosening a dual wheel from its engagement with a main tractor wheel. More specifically, the invention is a device for breaking the frictional engagement of the dual-wheel rim extension with the rim of the adjacent main wheel. The dual wheel remover of this invention overcomes the aforementioned difficulties in dual wheel removal, and does so without complex apparatus or complex operations.

The tractor dual wheel remover of this invention includes a rigid elongate member having a main-wheel end portion and an opposite dual-wheel end portion. The rigid elongate member is longer than the distance between one of the main-wheel eyelet members and its corresponding dual-wheel aperture, both previously described, and is preferably substantially straight.

The main-wheel end of the rigid elongate member includes means for non-rotatably receiving one of the eyelet members. The dual-wheel end portion is a threaded shaft dimensioned to be received into the corresponding dual-wheel aperture. A nut means is threadedly engaged with said shaft and has an outer bearing surface (end) which is engageable with the dual wheel about the dual-wheel aperture, that is, on one of the aforementioned tabs or other dual wheel portion forming such aperture.

In certain preferred embodiments, the main-wheel end portion of the rigid elongate member has a distal end which is engageable with the main wheel at positions about the eyelet member. In highly preferred embodiments, the eyelet-receiving means includes a non-circular socket having an inner cross-dimension greater than the thickness of the eyelet member but less than the width of the eyelet member, such that rotation of the socket about the eyelet is blocked. This is a simple yet strong structure for non-rotatable engagement of the main-wheel end with one of the eyelet members.

Such socket has a distal end edge for engaging the tractor main wheel and preferably has a depth greater than the height of the eyelet member such that the distal end edge of the rigid elongate member is engageable with the main wheel at positions about the eyelet member. This applies force not primarily on the eyelet itself but on its underlying supporting structure.

In highly preferred embodiments, the socket is formed of a cylindrical tube flattened at one end to form the aforementioned non-circularity. Such preferred non-rotatable structure allows the tractor dual wheel remover of this invention to be very inexpensive in construction.

In its most preferred form, the rigid elongate member has a series of elements of gradually increasing diameters, including the threaded shaft which forms the dual-wheel end portion and a tubular structure forming the main-wheel end portion. The tubular structure has a proximal end rigidly joined to the threaded shaft. Such tubular structure is shorter than the distance between a main-wheel eyelet member and its corresponding dual-wheel aperture, in order to facilitate insertion of the threaded shaft through such aperture before engaging the tubular structure with a main-wheel eyelet. The tubular structure is greater in diameter than the threaded shaft.

Such tubular structure preferably comprises at least two tubular elements of different diameters. These include a middle element of inner diameter sufficient to receive, and be rigidly joined (by welding or otherwise), to the threaded shaft, and a distal tubular element of still greater diameter which is rigidly secured at one end with respect to the middle element and at the other end forms the aforementioned eyelet-receiving means. Such eyelet receiving means is preferably formed by the flattening of such distal tubular element at its distal end, as earlier described.

Th substantial diameter of the tubular structure gives rigidity and strength to the elongate member. This is helpful and necessary for the removal of tractor dual wheels, which are of substantial size and very firmly secured in place prior to their removal.

The tractor dual wheel remover of this invention is utilized in the following manner: As in certain prior dual wheel removing operations, the tractor is first located in a position with its main tractor wheel (or both main tractor wheels) resting on a board or boards (or some other surface above the surrounding support level) such that little or no tractor weight is being supported by the dual wheel(s) to be removed. The J-bolt connecting links (usually four) which extend between the eyelets on the main wheel and the aligned apertures on the inside of the dual-wheel rim are then removed in the normal manner.

As is well known, removal of such J-bolts leaves the dual wheel tightly attached, with the dual-wheel rim extension in firm telescoping frictional engagement with the rim of the adjacent main wheel. The device of this invention is then used in the following manner to break such tight frictional engagement.

First, the rigid elongate member, with its nut fully engaged on the threaded shaft and moved well away from the end of the threaded shaft, is placed, main-wheel end portion first, inside the cylindrical dual-wheel rim extension and well into the hollow of the main-wheel rim, with the main-wheel end portion passing beyond the location of one of the main-wheel eyelets and its dual-wheel end portion passing beyond the aperture. This allows the rigid elongate member then to be moved outwardly such that the threaded shaft is received into one of the apertures from the inside thereof. The rigid elongate member is inserted into such aperture until its main-wheel end portion has passed the corresponding eyelet. Then, the rigid elongate member is aligned with the eyelet member and moved inwardly again until the main-wheel end portion of the rigid elongate member is received over such eyelet member.

Thus, the rigid elongate member is non-rotatably supported between the rim of the main wheel and the aperture on the dual wheel. The nut on the threaded portion then is spun toward the end of the threaded portion until its outer side bearing surface engages the dual wheel about the aperture. Forceable turning of the nut in an outward direction along the threaded shaft applies spreading force and eventually breaks the frictional engagement of the dual-wheel rim extension with the adjacent main-wheel rim.

Although spreading pressure is applied at an off-center position and in a non-symmetrical manner, the device of this invention works easily and quickly to remove tractor dual wheels.

BRIEF DESCRIPTION OF THE DRAWINGS

FIG. 1 is a perspective view of a tractor dual wheel remover in accordance with this invention.

FIG. 2 is a left end view of FIG. 1.

FIG. 3 is a fragmentary view of the location at which the dual wheel remover of this invention is used, showing one of several standard J-bolt connectors in its position spaced from the axis of the wheels.

FIG. 4 is a bottom view of FIG. 3, but with the J-bolt having been removed and the device of this invention in place ready to break the frictional engagement between the dual-wheel rim extension and the rim of the adjacent main wheel.

DETAILED DESCRIPTIONS OF PREFERRED EMBODIMENTS

The figures illustrate a preferred tractor dual wheel remover 10 in accordance with this invention.

FIGS. 3 and 4 illustrate the area in which tractor dual wheel remover 10 operates -- the juncture of a dual wheel 12 with an adjacent main wheel 14. Dual wheel 12 includes a dual-wheel rim extension 16 which, when dual wheel 12 is attached, is in telescoping frictional engagement with the rim 18 of main wheel 14. Rim extension 16 has a inner edge 20 along which such frictional engagement is greatest.

Attached to main wheel 14 or forming a part thereof are a number of eyelet members 22 spaced around main wheel 14, one of such eyelets 22 being shown in FIGS. 3 and 4. Each eyelet member 22 includes an opening 24. For each eyelet 22 there is a corresponding tab 26 extending radially inwardly from the dual-wheel rim inside surface 28. Each tab 26 is in alignment, in a direction parallel to the axis of dual wheel 12 and main wheel 14. With one of the eyelet members 22.

When dual wheel 12 is engaged in position for use J-bolts 30 join corresponding pairs of eyelets 22 and tabs 26, one of such J-bolts being shown in FIG. 3. As is well known, each J-bolt 30 has a curved end 32 engaging an eyelet member 22 and a straight threaded end 34 passing through an aperture 29 in tab 26, with a nut 36 engaging threaded end 34 to hold dual wheel 12 firmly in place.

Turning now to the invention itself, as illustrated in FIGS. 1, 2 and 4, tractor dual wheel remover 10 includes a straight rigid elongate member 38 having a main-wheel end portion 40 and an opposite dual-wheel end portion 42. Rigid elongate member 38, as shown in FIG. 4, is longer than the distance between eyelet member 22 and apertured tab 26.

Dual-wheel end portion 42 is a threaded shaft dimensioned to be received into aperture 29 in tab 26. Main-wheel end portion 40 is a tubular structure having a proximal end 44 which is rigidly joined to threaded shaft 42. The tubular structure which forms main wheel end portion 40 is shorter in length than the distance between eyelet member 22 and apertured tab 26, as illustrated in FIG. 4. Tubular structure 40 is greater in diameter than threaded shaft 42.

Tubular structure 40 includes a middle tubular element 46 telescoped over and rigidly attached to threaded shaft 42, and a distal tubular element 48 of greater diameter than middle tubular element 46. Distal tubular element 48 is rigidly secured to middle tubular element 46 at one end and at the other end forms an eyelet-receiving socket 50. The rigid connections are preferably made by welding.

Eyelet-receiving socket 50 terminates in a distal end edge 52 which is oblong in shape, the socket having been shaped by partial flattening of the distal end of distal tubular element 48. Oblong socket 50 has an inner cross-dimension (that is, its smaller cross-dimension) which is greater than the thickness of eyelet member 22 such that eyelet member 22 can be received therein. However, such inner cross-dimension is less in the width than the width of eyelet member 22 such that rotation of the socket about the eyelet member is blocked. In this way, eyelet member 22 is non rotatably received within socket 50.

Distal tubular element 48 is a hollow tube along most of its length such that socket 50 has a depth greater than the height of eyelet member 22. The height of eyelet 22, as shown in FIG. 3, extends between the tip 54 of eyelet 22 and surface 56 which is part of main wheel 14. Such hollowness of tubular element 48 allows distal end edge 52 of rigid elongate member 38 to bear on main wheel 14 at positions around eyelet member 22, that is, on surface 56 rather than on eyelet 22 itself.

Threadedly engaged with threaded shaft 42 of rigid elongate member 38 is a nut 58. Nut 58 has an outer bearing surface 60 which is engageable with tab 26. As nut 58 is turned in a direction toward end 62 of threaded shaft 42, outer bearing surface 60 engages tab 26 and spreads tab 26, and therefore dual wheel 12, away from main wheel 14. This action occurs until the frictional engagement of dual-wheel rim extension 16 with main-wheel rim 18 is broken and dual wheel 12 falls to the ground.

Tractor dual wheel remover 10 is made of rigid heavy steel members, sufficient in strength to apply substantial spreading force for the removal of dual wheels.

While the principles of this invention have been described in connection with specific embodiments, it should be understood clearly that these descriptions are made only by way of example and are not intended to limit the scope of the invention.

What is claimed:

1. A tractor dual wheel assembly with breakaway means, comprising:
   a main wheel with eyelets affixed thereto and a rim;
   a dual wheel having a dual wheel rim extension in telescoping coaxial frictional engagement with the main-wheel rim and having tabs affixed thereto each with an aperture aligned with one of said eyelets in a substantially axially parallel direction such that there are corresponding pairs of tabs and eyelets;
   a rigid elongate member having a main-wheel end portion non-rotatably receiving one of said eyelets and an opposite dual-wheel end portion forming a threaded shaft extending through the aperture of the corresponding tab, said threaded shaft being both axially and non-rotatably affixed with respect to the main-wheel end portion; and
   nut means threadedly adjustably engaged with the shaft in position between the corresponding eyelet and tab, said nut means having an outer surface engaged with the tab about its aperture,
   whereby rotation of the nut means easily and quickly causes breakage of the frictional engagement for removal of the dual wheel.

2. The tractor dual wheel remover of claim 1 wherein the rigid elongate member is substantially straight.

3. The tractor dual wheel remover of claim 2 wherein the main-wheel end portion has a distal end engageable with the main wheel at positions about the eyelet.

4. The tractor dual wheel remover of claim 2 wherein the eyelet-receiving means comprises a non-circular socket having an inner cross-dimension greater than the thickness of the eyelet member and less than the width of the eyelet member, whereby rotation of the socket about the eyelet member is blocked.

5. The tractor dual wheel remover of claim 4 wherein the socket has a distal end edge and has a depth greater than the height of the eyelet member, whereby the distal end edge is engageable with the main wheel at positions about the eyelet member.

6. The tractor dual wheel remover of claim 5 wherein the socket is formed of a tube which is substantially oval at one end to form said non-circularity and substantially round at its opposite end.

7. The tractor dual wheel remover of claim 2 wherein the main-wheel end portion comprises a tubular structure, said tubular structure having a proximal end rigidly joined to said threaded shaft, said tubular structure being shorter than the distance between one of said main wheel eyelet members and its corresponding dual-wheel aperture.

8. The tractor dual wheel remover of claim 7 wherein the tubular structure is greater in diameter than said threaded shaft.

9. The tractor dual wheel remover of claim 8 wherein the tubular structure comprises at least two tubular elements of different diameters, including a middle tubular element of diameter greater than the threaded shaft and a distal tubular element of still greater diameter secured at one end with respect to the middle tubular element and at the other end forming the eyelet-receiving means.

10. The tractor dual wheel remover of claim 9 wherein the eyelet-receiving means comprises a non-circular socket having an inner cross-dimension greater than the thickness of the eyelet member and less than the width of the eyelet member, whereby rotation of the socket about the eyelet member is blocked.

11. The tractor dual wheel remover of claim 10 wherein the socket has a distal end edge and has a depth greater than the height of the eyelet member, whereby the distal end edge is engageable with the main wheel at positions about the eyelet member.

12. The tractor dual wheel remover of claim 11 wherein the distal tubular element is substantially oval at one end to form said non-circular socket.

* * * * *